H. B. VEHSTEDT.
REINFORCING ATTACHMENT FOR THE REAR AXLES OF MOTOR VEHICLES.
APPLICATION FILED JAN. 2, 1917. RENEWED DEC. 6, 1917.
1,255,490.   Patented Feb. 5, 1918.
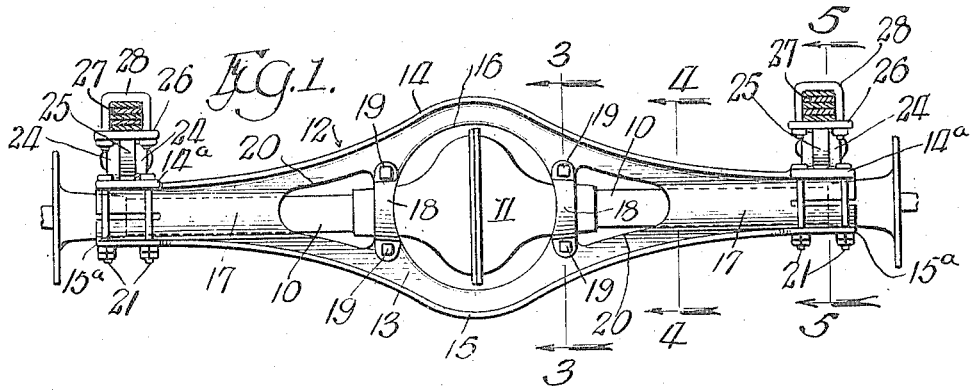
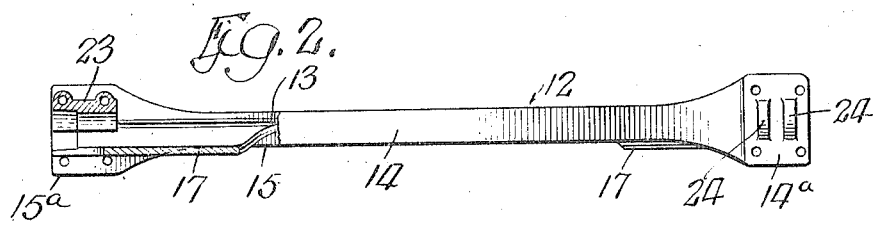
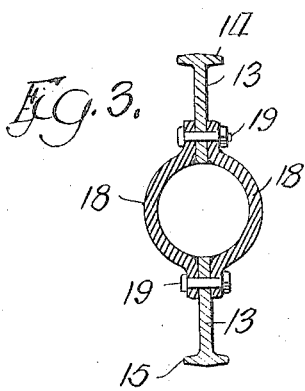
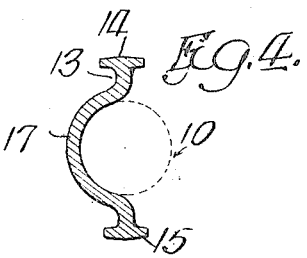
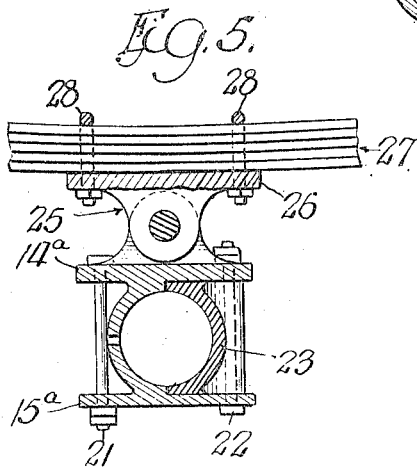
Witnesses:
Inventor
Harry B. Vehstedt

UNITED STATES PATENT OFFICE.

HARRY B. VEHSTEDT, OF CHICAGO, ILLINOIS.

REINFORCING ATTACHMENT FOR THE REAR AXLES OF MOTOR-VEHICLES.

1,255,490. Specification of Letters Patent. Patented Feb. 5, 1918.

Application filed January 2, 1917, Serial No. 140,027. Renewed December 6, 1917. Serial No. 205,893.

*To all whom it may concern:*

Be it known that I, HARRY B. VEHSTEDT, a citizen of the United States, and a resident of Chicago, in the county of Cook and State of Illinois, have invented certain new and useful Improvements in Reinforcing Attachments for the Rear Axles of Motor-Vehicles; and I do hereby declare that the following is a full, clear, and exact description thereof, reference being had to the accompanying drawings, and to the letters of reference marked thereon, which form a part of this specification.

This invention relates to an improved reinforcing attachment for the rear axles of motor vehicles, and consists of the matters hereinafter described, and more particularly pointed out in the appended claims.

The object of the invention is to provide a reinforcing attachment for the rear axles of motor vehicles, for strengthening said axle so that it may safely carry a greater load than that for which it was originally designed, as when it is used for truck purposes while its original design was merely for passenger vehicle use. The improved reinforcing attachment is designed to substantially remove the load from the rear axle housings or to apply the load to the extreme ends of said housing, and at the same time to provide such support for said housings as to maintain the axle shafts in true alinement, so that there is no loss of power due to friction on account of the shafts binding in the housings. The many advantages of my invention will appear more fully as I proceed with my specification.

In the drawings:

Figure 1 represents a view in rear elevation of my improved reinforcing attachment, as applied to an axle housing of a motor vehicle.

Fig. 2 represents a plan view of the reinforcing attachment, a part of said attachment being broken away to more clearly show the construction thereof.

Fig. 3 represents a transverse, vertical section view through the reinforcing attachment, on an enlarged scale, the plane of the section being indicated by the line 3—3 of Fig. 1.

Fig. 4 is a similar view, the plane of the section being indicated by the line 4—4 of Fig. 1.

Fig. 5 is a transverse, vertical section view through one end of the improved reinforcing attachment, the plane of the section being indicated by the line 5—5 of Fig. 1.

Referring now to that embodiment of my invention illustrated in the drawings:— 10—10 indicate the rear axle housings of a motor vehicle, and 11, 11, indicate the abutting enlarged, inner ends of said housings, which inclose the differential gearing.

12 indicates, as a whole, the reinforcing attachment for the rear axle. Said attachment consists, as shown herein, of a structure somewhat similar in design to the well-known I-beam, and comprises top and bottom flanges 14 and 15, and an intermediate web 13. The top and bottom flanges are not parallel throughout their length as in the ordinary I-beam, but diverge from each other from the ends of the beam toward the middle, that is to say, in the neighborhood of the enlarged, inner ends 11 of the housings 10, where they are spaced apart a sufficient distance to pass above and below the parts 11. The web 13 is cut away at this point to provide an opening 16, in this instance an annular opening, which is adapted to receive the housing-parts, 11.

The web 13 is flat in the middle part of the beam, but is curved transversely or otherwise formed, toward the ends of the beam as indicated at 17 (see Fig. 4), to provide bearing engagement with the ends of the housings. The web parts 17 are adapted to be brought into such engagement, from the rear sides of said housings. At either side of the opening 16, there are provided oppositely disposed, semi-cylindrical straps 18, 18 (see Figs. 1 and 3) which are of such radius as to engage the housings at points near the ends 11. Said straps are held in such engagement and are attached at the same time to the web 13, by means of suitable bolts 19. If desired, one of each pair of said straps, preferably the one on the rear side of the beam, may be cast or made integral with the main I-beam structure of the attachment. For the sake of lightening the beam, the web 13 is cut away as indicated at 20, at either side of the main central opening 16.

At the ends of the attachment, the top and bottom flanges 14, 15 are widened out to provide laterally extending ears 14ª, 15ª for clamping bolts 21, 22 located at each side of the web. The end parts 17 of the web 13, are preferably split as shown, and are drawn closely into engagement with the axle housings by the clamping bolts 21. The opposite side of said housing, that is to say, the front part, is engaged by a block 23, which is held in place between the widened end parts 14ª, 15ª of the flanges 14, 15, by means of the clamping bolts 22.

The reinforcing attachment is attached at its ends to the springs of the automobile. In the embodiment of the invention, illustrated herein, connection with said springs is provided as follows:—Each of the top end plates or flanges 14ª is thickened to provide a spring seat, and has longitudinally spaced ears 24—24 between which is hinged a block 25. This block has a base or top plate 26 which engages the bottom leaf of a spring 27, and is attached by U bolts 28 to said spring, in a familiar manner.

From the construction described, it will be apparent that the attachment itself is directly connected to the springs which carry the load. It in turn, has supporting engagement with the rear axle housings, so that the attachment not only takes the load and relieves the rear axle of this strain, but in addition, acts as a reinforcement and support for the axle housings themselves.

From the construction described, it is apparent that the device may be attached to the rear axle of any automobile or motor vehicle, from the rear, by first removing the front straps 18 and the blocks 23. As it is brought into proper engagement with the rear axle housings, said blocks and straps are attached in place, as heretofore described, and the springs are connected to the seat plates 14ª at the end of the top flange of the device.

While in describing my invention, I have referred to certain details of mechanical construction and arrangement of parts, I do not limit myself thereto except as pointed out in the appended claims.

I claim as my invention:

1. A reinforcing attachment for the rear axle housings of automobiles, comprising a beam having top and bottom flanges and an intermediate web, said web having an opening to receive the enlarged, inner ends of the housings, and means for attaching said web to said housings.

2. A reinforcing attachment for the rear axle housings of automobiles, comprising a beam having top and bottom flanges and an intermediate web, said web having an opening to receive the enlarged, inner ends of the housings and end parts adapted to engage the axle housings, and means for attaching said beam to said housings.

3. A reinforcing attachment for the rear axle housings of automobiles, comprising a beam having top and bottom flanges and an intermediate web, said web having an opening between its ends to receive the enlarged, inner ends of the housings, and end parts adapted to engage the axle housings, and means for attaching said beam to said axle housings at their ends and at points spaced therefrom.

4. A reinforcing attachment for the rear axle housings of automobiles, comprising a beam having top and bottom flanges and an intermediate web, said flanges diverging from the ends toward the middle of said beam, said web having an opening at its middle to receive the enlarged, inner ends of said housings and having parts at its ends adapted to engage the housings, and detachable straps associated with said beam for attaching it to said axle housings.

5. A reinforcing attachment for the rear axle housings of automobiles, comprising a beam having top and bottom flanges and an intermediate web, said flanges diverging from the ends of said beam toward its middle, said web having an opening at its middle to receive the enlarged, inner ends of said housings and having parts at its ends adapted to engage the housings, the top and bottom flanges being widened at their ends, straps adapted to be attached to the web near the opening at its middle and to engage the housings, and clamping blocks secured between the widened end parts of the top and bottom flanges of the beam, said blocks co-acting with the end parts of said web, to clamp the beam to the axle housings.

In testimony, that I claim the foregoing as my invention I affix my signature in the presence of two witnesses, this 28th day of December A. D. 1916.

HARRY B. VEHSTEDT.

Witnesses:
KARL W. DOLL,
T. H. ALFREDS.

Copies of this patent may be obtained for five cents each, by addressing the "Commissioner of Patents, Washington, D. C."